US008881135B2

(12) United States Patent
Yamamuro (10) Patent No.: US 8,881,135 B2
(45) Date of Patent: Nov. 4, 2014

(54) INFORMATION PROCESSING APPARATUS FOR ASSOCIATING EVENT INFORMATION IN AN IMAGE INPUT DEVICE WITH AN APPLICATION PROGRAM THAT OPERATES ACCORDING TO THE EVENT INFORMATION (75) Inventor: Soichi Yamamuro, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 13/380,014

(22) PCT Filed: Jun. 28, 2010

(86) PCT No.: PCT/JP2010/004271
§ 371 (c)(1),
(2), (4) Date: Dec. 21, 2011

(87) PCT Pub. No.: WO2011/001659
PCT Pub. Date: Jan. 6, 2011

(65) Prior Publication Data
US 2012/0096452 A1 Apr. 19, 2012

(30) Foreign Application Priority Data

Jun. 30, 2009 (JP) ................................. 2009-155672

(51) Int. Cl.
G06F 9/45 (2006.01)
G06F 9/445 (2006.01)
(52) U.S. Cl.
CPC .................................. G06F 9/44505 (2013.01)
USPC ........................................................ 717/174
(58) Field of Classification Search
None
See application file for complete search history.

(56) References Cited

U.S. PATENT DOCUMENTS

| 6,317,880 | B1 * | 11/2001 | Chamberlain et al. | ........ 717/174 |
| 6,480,304 | B1 | 11/2002 | Van Os | |
| 2003/0084439 | A1 * | 5/2003 | Perkins et al. | ................. 717/177 |
| 2006/0221370 | A1 * | 10/2006 | Iida | ............................... 358/1.13 |
| 2007/0045415 | A1 * | 3/2007 | Usui | .............................. 235/435 |
| 2007/0106984 | A1 * | 5/2007 | Birk Olsen et al. | ........... 717/174 |
| 2008/0127175 | A1 * | 5/2008 | Naranjo et al. | ................ 717/174 |
| 2010/0277761 | A1 * | 11/2010 | Sakura | .......................... 358/1.15 |

FOREIGN PATENT DOCUMENTS

| JP | 2002318694 A | * | 10/2002 |
| JP | 2005-338940 A | | 12/2005 |
| JP | 2007-122555 A | | 5/2007 |

* cited by examiner

Primary Examiner — Don Wong
Assistant Examiner — Daxin Wu
(74) Attorney, Agent, or Firm — Canon U.S.A., Inc. IP Division (57) ABSTRACT A method for controlling an information processing apparatus which can be connected to an image input device, by installing an application program and a control program, can activate the application program by an event occurring by user's operations in the image input device, and cause the control program to control the image input device by an instruction of the application program includes installing the control program in an operating system of the information processing apparatus, determining whether the application program is installed in the information processing apparatus, when the application program is not installed, installing on the information processing apparatus an event correspondence application program which can be activated by the same event as the application program and can install the application program in the information processing apparatus, and registering the event correspondence application program as an application program which is activated by the event in the information processing apparatus.

3 Claims, 7 Drawing Sheets

INFORMATION PROCESSING APPARATUS FOR ASSOCIATING EVENT INFORMATION IN AN IMAGE INPUT DEVICE WITH AN APPLICATION PROGRAM THAT OPERATES ACCORDING TO THE EVENT INFORMATION

TECHNICAL FIELD

The present invention relates to an information processing apparatus that associates event information in an image input device with an application program that operates according to the event information, and a control method of the information processing apparatus and a program.

BACKGROUND ART

Conventionally, image input devices which is used when pieces of information data about paper media or negative and positive films, and so forth are digitized and read into a personal computer (PC) or the like include devices, for example, an imaging scanner and a multifunction peripheral. Among these, there is a device in which an application program on a host PC connected to the device is activated upon receiving an event that occurs by pressing a button of a device main body, and the application program requests a control program (also referred to as a driver program) for controlling the image input device to input an image, and the image input device performs an operation of image input by an instruction from the control program that has received the request.

As a method for implementing such a series of operations, Windows (registered trademark) Imaging Acquisition (hereinafter WIA), or Still Image Service (hereinafter STI), in Windows (registered trademark) as a Microsoft's operating system (OS) is prepared as functions of the OS side. There can be specified an operation at the time an event occurs by pressing a button on the image input device by using these functions. When the button on the device main body is pressed by an operation of a user on the image input device, event information is notified via the WIA or the STI of the OS. In Windows (registered trademark), by describing the event information in an information (INF) file of the control program and installing the INF file, an event when the button on the device main body is pressed can be automatically registered on the OS. The registration can be also performed by similarly describing a command referred to as co-installer on the INF file, and executing the co-installer which a vender originally has created. In either method the control program performs the registration in accordance with specifications and functions which the OS side provides. Moreover, there is also equipped an event management program for causing the application program to be automatically executed at the time the event is detected.

Further, by declaring that the application program side is a program corresponding to the event, it is possible to cause the OS to recognize a program selectable at the time the event occurs. As a result, when the button of the device main body is pressed, it is only necessary to notify from the device side to the host PC side of the event of the button pressing. In subsequent operations, the application program on the host PC connected to the device controls the device using the control program, and implements an image input (for example, if the image input device is an image scanner, reading of image) by the similar configuration to performing image reading by normal operation of the host PC.

As a technique for associating an application program which is activated when an event of the image input device occurs, there is a method for detecting an application program which has been already installed, when the control program is installed and associating it with the event. (See U.S. Pat. No. 6,480,304).

The method discussed in U.S. Pat. No. 6,480,304 is predicated on that the application program has been already installed when the control program is installed. This is because, a task for specifying an operation when an event occurs by pressing a button of the image input device according to the specification and function which the OS side provides as described above, is to be performed by the control program using the INF file or the co-installer. This is further because, conventionally, when a user performs an installation setup of the image input device, first, software including the application programs have been installed from its accompanying media (e.g., a compact disk read-only memory (CD-ROM)/a digital versatile disk (DVD)/a memory) and subsequently connection between the image input device and the host PC is established. Therefore, installation of the control program is completed after the connection between the image input device and the host PC has been established, and thus the application program corresponding to the event of the input device has been already installed. As a result, association between the event and the application program by the control program can be easily performed.

However, in recent years, there have become widespread a service for automatically downloading and installing a corresponding control program (as an example, Microsoft's Windows (registered trademark) Update) when the device is connected to the host PC, and a service (pre-install driver) for including the control program in advance within the operating system. Therefore, there has become familiar a situation in which the control program can be used as long as the device is connected to the host PC. As a result, an opportunity where the control program is installed earlier than installation of the application programs has increased. In such a case, the application program has not been installed when the control program is installed, and accordingly the control program cannot associate the event with the application program. Therefore, there is a problem that a user has to manually associate the control program with the application program after installation of the application program.

As a result, when an event occurs, the user cannot determine which application program is to be executed, and instead troublesome tasks are needed for displaying a list of application programs and causing the user to select a desired application program from the list.

CITATION LIST

Patent Literature

PTL 1: U.S. Pat. No. 6,480,304

SUMMARY OF INVENTION

According to an aspect of the present invention, there is provided a method for controlling an information processing apparatus which can be connected to an image input device, by installing an application program and a control program, can activate the application program according to an event which occurs by a user's operation in the image input device, and cause the control program to control the image input device according to an instruction of the application program. The method includes installing the control program in an operating system of the information processing apparatus, determining whether the application program is installed in the information processing apparatus, if it is determined that the application program is not installed, installing on the information processing apparatus an event correspondence application program which can be activated according to the same event as the application program and can install the application program in the information processing apparatus, and registering the event correspondence application program as an application program which is activated according to the event in the information processing apparatus.

According to another aspect of the present invention, there is provided an information processing apparatus which can be connected to an image input device, by installing an application program and a control program, can activate the application program according to an event which occurs by a user's operation in the image input device, and cause the control program to control the image input device according to an instruction of the application program. The information processing apparatus includes a control program installation unit configured to install the control program in an operating system of the information processing apparatus, and a registration unit configured to register an application program which is activated according to the event in the information processing apparatus, wherein the control program installation unit determines whether the application program is installed in the information processing apparatus, and if it is determined that the application program is not installed, the control program installation unit installs in the information processing apparatus the control program and an event correspondence application program which can be activated according to the same event as the application program and can install the application program in the information processing apparatus, and wherein the registration unit registers the event correspondence application program on the information processing apparatus regarding as an application program which is activated according to the event.

According to the present invention, even in a case where an application program corresponding to an event is installed after a control program of an image input device has been installed, an application registration to an event management program is completed by a virtual application program, and as a result of which installation and activation of the application program becomes immediately possible by generation of the event.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
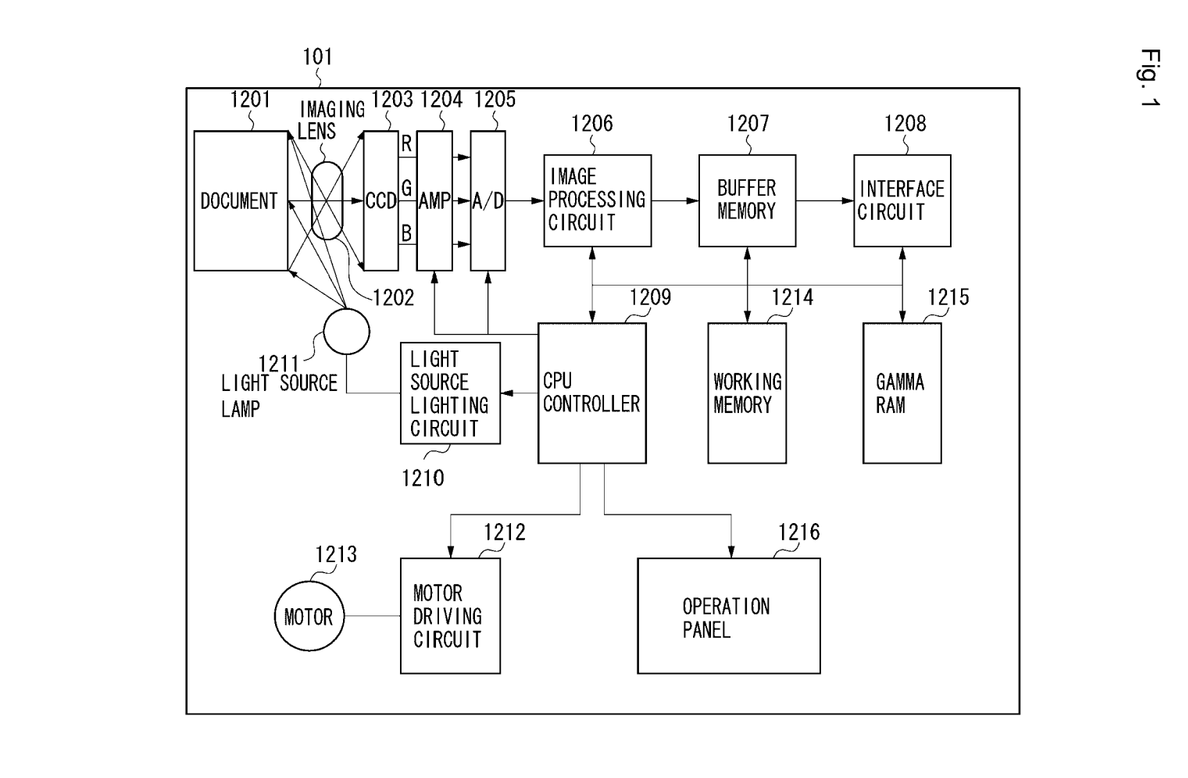
FIG. 1 is a block diagram illustrating a main functional configuration of a scanner.

Hereinbelow, a first exemplary embodiment of the present invention will be described in detail with reference to accompanying drawings. FIG. 1 is a block diagram illustrating a functional configuration of a scanner 101 as an image input device.

In FIG. 1, a document 1201 is read. A light source lamp 1211 illuminates the document 1201, and a reflected light with intensity according to density of a document surface, through an imaging lens 1202, forms an image on a line image sensor such as a charge-coupled device (CCD) sensor as a solid-state image sensor 1203. A light source lighting circuit 1210 drives to illuminate the light source lamp 1211. Next, an amplifier 1204 amplifies an analog image signal output of the line image sensor 1203. A motor drive circuit 1212 drives an optical system drive motor 1213 such as a stepper motor, and outputs an excitation signal of the drive motor 1213 in response to a control signal from a central processing unit (CPU) controller 1209 as a system control unit of an image reading apparatus 101. An analog-to-digital (A/D) converter 1205 converts an analog image signal output from the amplifier 1204 into a digital image signal. An image processing circuit 1206 performs image processing such as an offset correction, a shading correction, a digital gain adjustment, a color balance adjustment, a color masking conversion, a resolution conversion in main and sub-scanning directions, on an image signal converted into a digital signal. A buffer memory 1207 is constituted with a random access memory (RAM), and temporarily stores image data. An interface circuit 1208 mediates commands or image communication with the host PC connected to the scanner.

A working memory 1214 is used as a temporary working memory when the image processing circuit performs image processing. The working memory 1214 is used for correction of offsets among red, green and blue (RGB) lines which included in image signals from respective line sensors for RGB arranged in parallel with a predetermined offset on the line image sensor 1203. Moreover, the working memory 1214 performs temporary storage of various types of data such as the shading correction and the like. A gamma lookup table (LUT) 1215 is used for storing density gamma conversion LUT and performing gamma correction. A CPU controller 1209 controls the image reading apparatus 101 in accordance with a command from the host PC connected thereto, and also controls the motor drive circuit 1212, the light source lighting circuit 1210, and the image processing circuit 1206. A state in which a scan button provided on an operation panel 1216 is pressed is detected by the CPU controller 1209, and is notified to a host PC 221 in FIG. 2 connected thereto via the interface circuit 1208.

Figure 2:
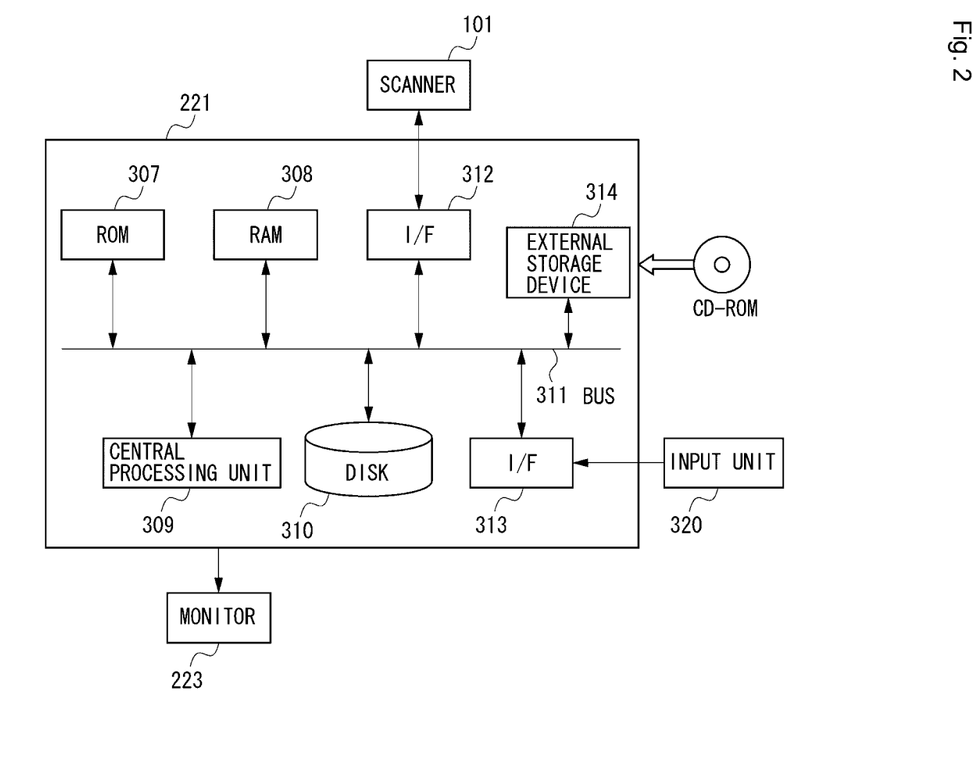
FIG. 2 is a block diagram illustrating a configuration of general computer utilized as a host personal computer (PC) for the scanner.

Next, a schematic configuration of the host PC 221 which is a general type PC and operates on an operating system as the information processing apparatus used for control of the scanner 101 in FIG. 1 will be described in brief with reference to FIG. 2.

The host PC 221 includes a read-only memory (ROM) 307, a RAM 308, a central processing unit 309, a disk device 310, a bus 311, an I/F 312, an I/FF 313, and an external storage device 314. The disk device 310 stores the OS or a scanner control program. The disk device 310 loads the OS on the ROM 307, and further loads programs such as a scanner control program. The RAM 308 provides a storage area and a work area necessary for an operation of the above described control program. The central processing unit 309 performs processing according to the program stored in the ROM 307. The bus 311 connects the above described components, and enables the components to transmit and receive data to and from each other.

The I/F 312 performs communication with the scanner 101, implements the communication by universal serial bus (USB) interface similarly to an I/F 231 of the scanner 101, but it is also possible to adopt another interface such as IEEE 1394, a small computer system interface (SCSI), a local area network (LAN), and a Wireless LAN. The I/F 313 connects to an input unit 320 such as a mouse or a keyboard. The external storage device 314 is used to drive external storage media such as a floppy disk and a CD-ROM. In the case where a program is stored in the external storage medium, instead of stored in the ROM 307 in advance as described above, the I/F 313 reads and downloads the program. As a matter of course, it is possible to download the program through a network connector (not illustrated) via a network.

Figure 3:
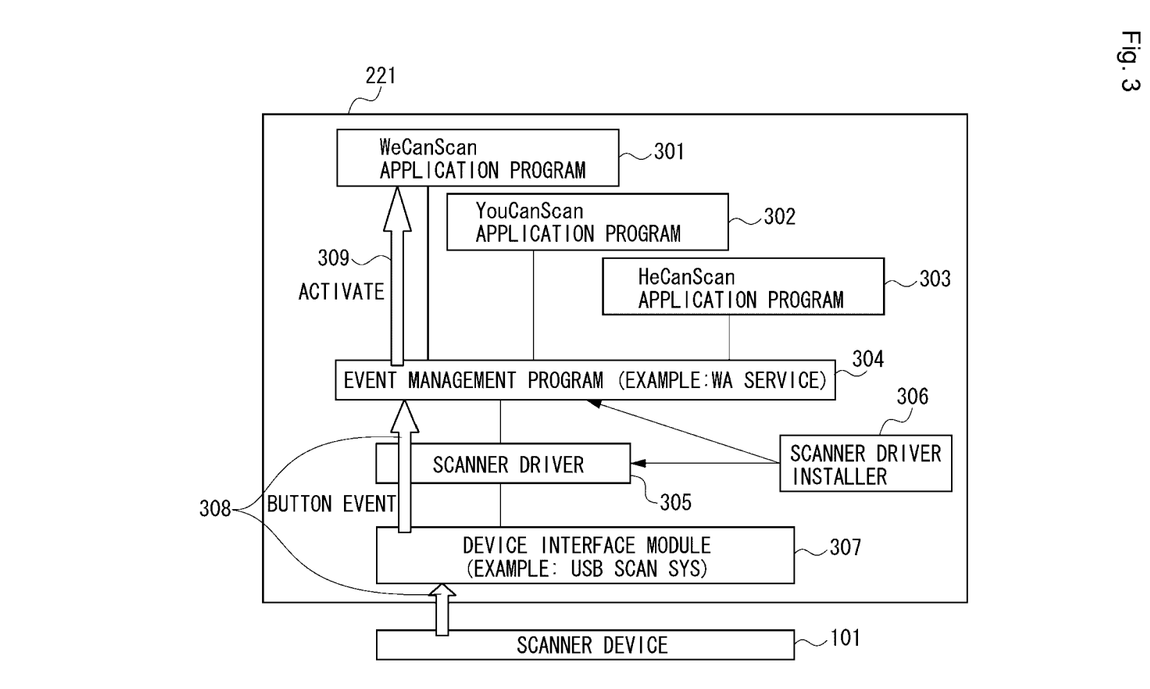
FIG. 3 is a block diagram of a general software configuration within the host PC which becomes a precondition of the present invention.

Next, software module configuration within the host PC 221 in FIG. 2 will be described below. FIG. 3 is a module configuration diagram illustrating general relations among the scanner driver as the control program that controls the scanner that becomes the precondition of the present invention, the scanner driver installer, an event management program, and an application program corresponding to an event.

In this example, three application programs 301, 302, and 303 exist, and respective installers register them as selection target application programs corresponding to button events on a button event management program 304 after the application programs have been installed. In Windows (registered trademark) Me/XP/Vista, the button event management program is a function that WIA service comprises. In the case of the Windows (registered trademark), it is generally known that the above described registration task can be performed using Standard API for WIA IWiaDevMgr::RegisterEvent-CallbackProgram.

On the other hand, a scanner driver installer 306 firstly installs the scanner driver 305. It is assumed that the scanner device according to the present exemplary embodiment includes a "WeCanScan application button" that expects a scan operation from WeCanScan application program 301 (provisional name) on an operation panel 1216 as the application program. Therefore, the scanner driver installer 306 registers an event of the "WeCanScan application button" on the above described event management program 304 when the scanner driver 305 is installed. In the case of the Windows (registered trademark), it is known that the event button registration can be performed by providing a statement of format as described below in the driver information file (INF file=Information File).

Scanner device name
Include=sti.inf
Needs=STI.USBSection
SubClass=StillImage
. . . . . . . . . . . .
Events=PushEvent -continued . . . . . . . . . . . .
PushEvent
PushButton="WeCanScan application button",{[button-specific GUID]},*

The scanner driver installer 306 selects the WeCanScan application program 301 from a list of the application programs which have been already registered on the event management program 304, after registration of the above described "WeCanScan application button" event is completed, and registers the WeCanScan application program 301 as an application program to be activated in response to the above described "WeCanScan application button" event notification.

It is known that the processing can be implemented, in the Windows (registered trademark), by searching the WeCanScan application program from the list of the application programs registered under HKEY_LOCAL_MACHINE/SYSTEM/Current-ControlSet/Control/StillImage/Event/STIProxyEvent within the OS registry, and by recording a global unique identifier (GUID) of the WeCanScan application program registered thereon on the OS registry as the application program corresponding to the "WeCanScan application button" event.

Accordingly, the configuration can implement operability that the "WeCanScan application button" event is notified from the scanner 101 to the scanner driver 305 via a device interface module 307, and the WeCanScan application program 301 is automatically activated in processing 309.

Figure 4:
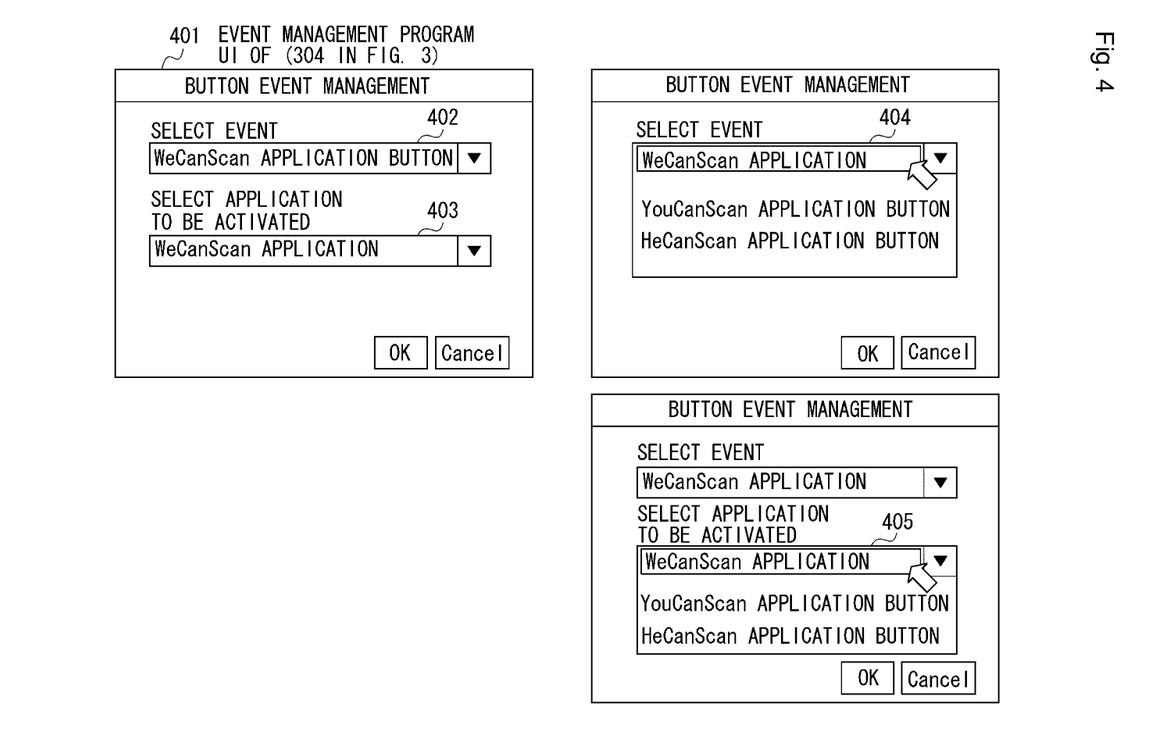
FIG. 4 is an example of a user interface (UI) of an event management program in the host PC.

For specifically describing a role of the above described event management program 304, a sample of a UI which can be installed on the event management program will be described below with reference to FIG. 4.

An event management program UI 401 stores a list of button events registered when a driver is installed as shown in a column 402. The event management program UI 401 also stores a list of the application programs which the installers of the application programs have registered as shown in a column 403. Then, other registered button events can be referred to and selected from a column 404. It is also possible to refer to and change an application program corresponding to a selected button event from a column 405.

The operations described above are effective for the case where the WeCanScan application program is installed earlier than the scanner driver. However, on the contrary, when the scanner driver is installed earlier than the WeCanScan application program, it does not come into effective. Therefore, in the present invention, the scanner driver installer is caused to perform the operations illustrated in FIG. 5 and FIG. 6.

Figure 5:
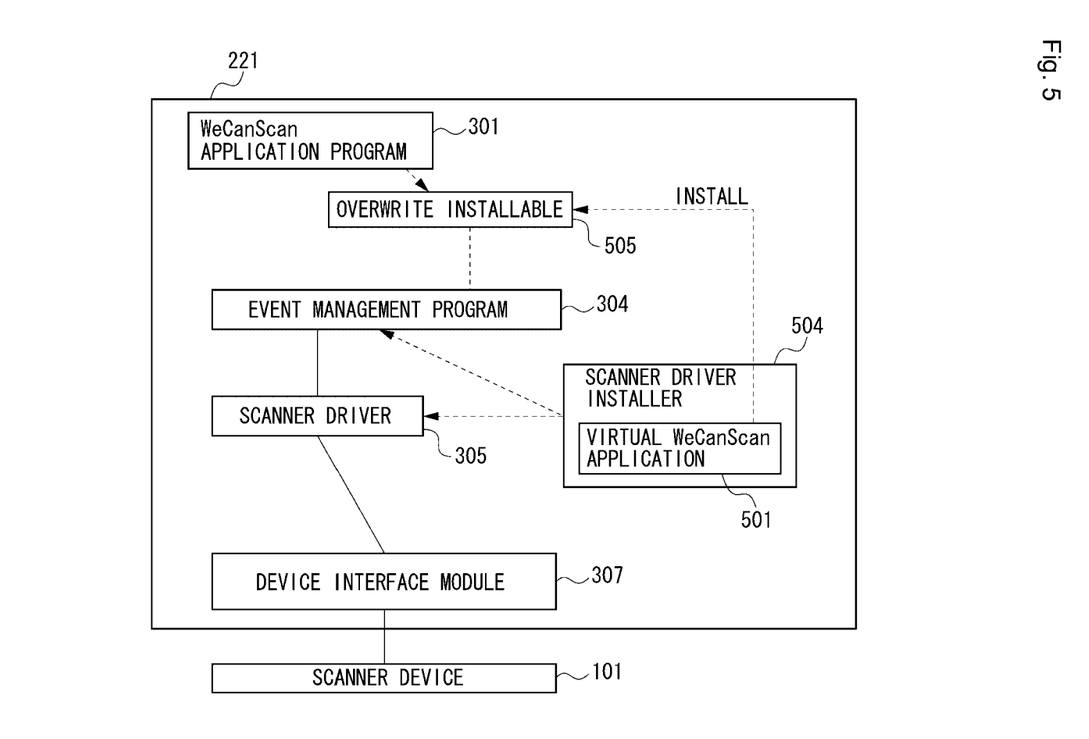
FIG. 5 is a block diagram illustrating a positioning of a virtual application program according to the present invention.

FIG. 5 illustrates functions of the scanner driver installer and positioning of the virtual WeCanScan application program according to the present invention. In FIG. 5, the same numerical references are used for the same components in terms of configuration.

The scanner driver installer 504 according to the present invention includes a program 501 which is an inherent scanner application and can be executed under the same condition as the WeCanScan application program. Hereinafter the program is referred to as a virtual WeCanScan application 501. When an inherent WeCanScan application is a program file with an executable file format of WeCanScan.exe, it is assumed that the above described virtual WeCanScan application 501 is also an executable file of WeCanScan.exe. The virtual WeCanScan application 501 has totally different content despite the same name as the inherent WeCanScan application. The virtual WeCanScan application 501 is a program for opening the Internet browsing program already existing on the OS, and executing an operation to link to a location (uniform resource locator (URL)) where the inherent WeCanScan application is prepared.

Figure 6:
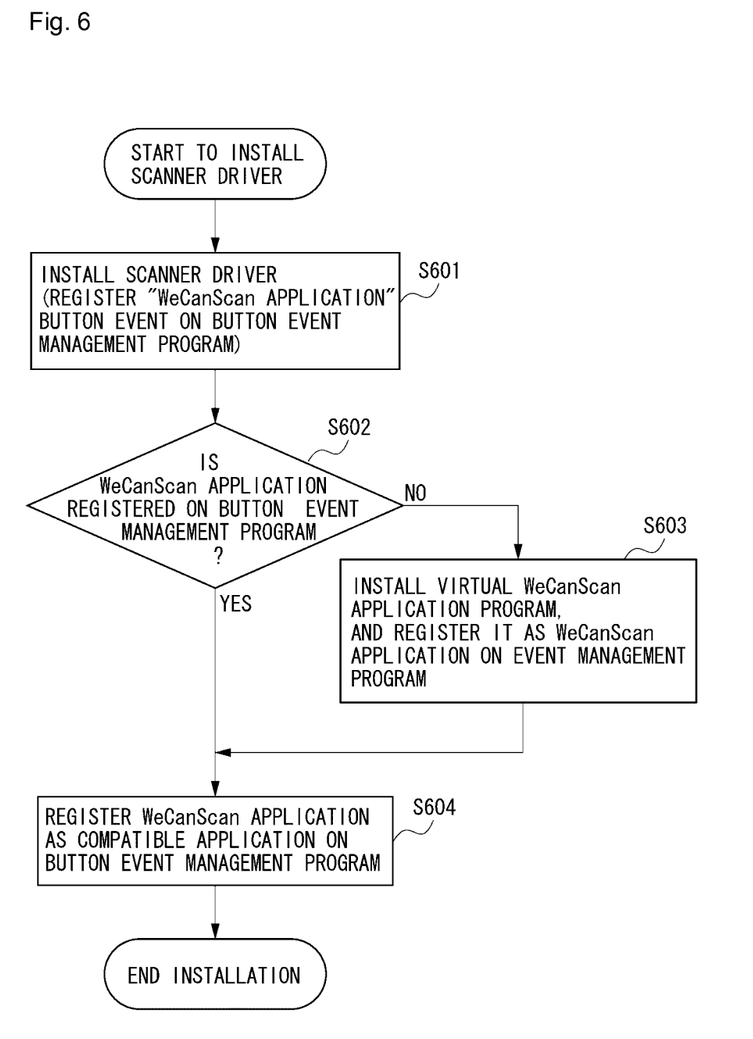
FIG. 6 is a flowchart illustrating an operation of the present invention.

FIG. 6 is a flowchart illustrating an operation procedure of the scanner driver installer according to the present invention.

In step S601, the scanner driver installer 504 installs the scanner driver 305, and registers the "WeCanScan application button" event. Then, in step S602, the scanner driver installer 504 determines whether the WeCanScan application program is registered based on information about the event management program 304. If the WeCanScan application program is not registered (NO in step S602), then in step S603, the scanner driver installer 504 installs the virtual WeCanScan application program WeCanScan.exe 501 which the scanner driver installer 504 includes, and registers it on the event management program.

In this process, if a location 505 on the OS where an executable file of the inherent WeCanScan application programs is installed is \\Program Files\WeCanScan\, for example, the scanner driver installer 504 performs control to install the WeCanScan.exe 501 as the executable file of the virtual WeCanScan application program in the same location.

Then in step S604, the scanner driver installer 504 registers the WeCanScan application program on the event management program 304 as the application program for the "WeCanScan application button" event and terminates the processing.

Figure 7:
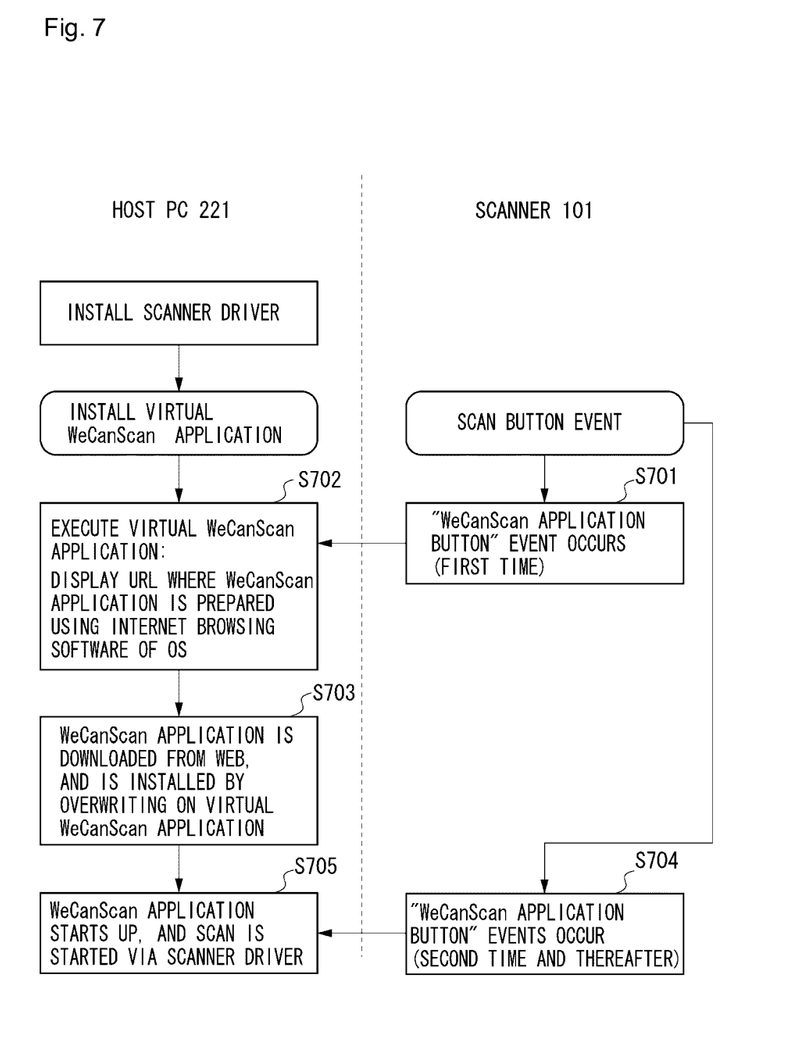
FIG. 7 is a flowchart illustrating an operation of a virtual application program.

Next, operations performed until the inherent WeCanScan application program is installed with respect to the virtual WeCanScan application program will be described below with reference to an operation transition diagram illustrated in FIG. 7.

In this process, installation of the scanner driver and the virtual WeCanScan application program is assumed to be finished by the scanner driver installer according to a flow illustrated in FIG. 6.

The WeCanScan application program is activated according to a user's instruction (occurrence of an event) from the scanner 101. In other words, in step S701, a first event occurs by the WeCanScan application button.

In step S702, the host PC receives the first event by the WeCanScan application button and executes the virtual WeCanScan application program. The virtual WeCanScan application program has a location where the inherent WeCanScan application program is prepared. Then, the inherent WeCanScan application program is displayed on a monitor 223 using the Internet browsing software.

In step S703, the user searches the display information for the inherent WeCanScan application program 301, downloads it on the host PC 221, and executes installation thereof.

When description is given referring to FIG. 5, the WeCanScan application program 301 is installed at the location 505 where the virtual WeCanScan application program has been installed to overwrite the virtual WeCanScan application program therewith. In this occasion, association information with events registered when the virtual WeCanScan application program is installed is kept stored.

The event which has occurred in step S701 is kept stored on the host PC, and the event is again passed to the WeCanScan application program after the WeCanScan application program is installed. The scanner may be allowed to perform scan operation by controlling the scanner driver. Alternatively, the event which has occurred in step S701 may be discarded, and events at second time and after may be caused to occur again in step S704 from the scanner 101 according to the user's instruction. In the flow, in step S704, if the "WeCanScan application button" event at the second time occurs by the user after the WeCanScan application program is installed in step S703, then in step S705, the WeCanScan application program 301 is activated to control the scanner via the scanner driver 305, so that reading of an image is started.

As described above, the virtual application program for installing the application program corresponding to an inherent event is installed when the scanner driver is installed and registered by associating with the event. Consequently, when the event occurs, the virtual application is activated, and thus the inherent application program can be installed by overwriting the virtual application.

Moreover, registration information about association between the virtual application program and the event by the scanner driver installer 504 is taken over as it is, so that registration does not need again when the application program is installed. In other words, activation and execution of the application program can be performed for the event from the scanner 101.

Consequently, the association between the event and the application can be registered without being concerned about an installation order of the scanner drivers and the application software corresponding to the events. Moreover, the application program corresponding to the event it can be automatically installed without largely changing the conventional configuration, and thus convenience in user operation can be improved.

In the first exemplary embodiment, as an example in which the virtual application program and the inherent application program have the same execution conditions, the case of a format in which the virtual application program and the inherent application program has the same executable file name existing at the same location on the OS has been described. However, for example, a target application may exist on a network such as the Internet not in the host PC, like a Web application. Even in such a case, by stating a saving destination of the application program in a URL format in similar way, an access to the appropriate Web can be implemented, and the present invention can be adapted in similar way.

In the first exemplary embodiment, as an example of a function which can access the location (URL) where the inherent application is prepared, as an operation specification of the virtual application, a function for directly displaying the location has been described using the Internet browsing software already existing on the OS. However, a function for opening the URL using unique software, or a function for automatically downloading the application software from the URL may be used. Alternatively, even if information of the saving destination of the application is simply displayed, and the user acquires the application based on the information, the equivalent effect can be obtained.

Further, in the present exemplary embodiment, the scanner device is described as an example of the image input device. However, the similar effect can be obtained, if the exemplary embodiment of the present invention is implemented by other devices that can perform image input operations such as, a digital camera, a memory device, a device with a fax receiving function, and a device equipped with a memory slot.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155672 filed Jun. 30, 2009, which is hereby incorporated by reference herein in its entirety.

The invention claimed is:

1. A method for controlling an information processing apparatus which can be connected to an image input device, by installing an application program and a control program, can activate the application program according to an event which occurs by a user's operation in the image input device, and cause the control program to control the image input device according to an instruction of the application program, the method comprising:
   installing the control program in an operating system of the information processing apparatus;
   determining whether the application program is installed in the information processing apparatus;
   if it is determined that the application program is not installed, installing on the information processing apparatus an event correspondence application program which can be activated according to the same event as the application program and can install the application program in the information processing apparatus; and
   registering the event correspondence application program as an application program which is activated according to the event in the information processing apparatus,
   wherein the event correspondence application program includes information about a location where the application program is stored, and further comprising:
   accessing the location based on the information about the location where the application program is stored and acquiring the application program after the registration; and
   installing the acquired application program in the same storage location in the information processing apparatus where the event correspondence application program is installed to overwrite the event correspondence application program therewith.

2. The method according to claim 1, further comprising: installing the application program without rewriting a content registered in the information processing apparatus in the registration.

3. An information processing apparatus which can be connected to an image input device, by installing an application program and a control program, can activate the application program according to an event which occurs by a user's operation in the image input device, and cause the control program to control the image input device according to an instruction of the application program, the information processing apparatus comprising:
   a memory;
   one or more processors coupled to the memory which executes the following:
      installing the control program in an operating system of the information processing apparatus; and
      registering an application program which is activated according to the event in the information processing apparatus,
      determining whether the application program is installed in the information processing apparatus, and
      if it is determined that the application program is not installed, installing in the information processing apparatus the control program and an event correspondence application program which can be activated according to the same event as the application program and can install the application program in the information processing apparatus, and
   registering the event correspondence application program on the information processing apparatus regarding as an application program which is activated according to the event,
      wherein the event correspondence application program includes information about a location where the application program is stored, and
      further comprising:
         after the event correspondence application program is registered, accessing the location where the application program is stored based on the information about the location to acquire the application program; and
         installing the application program acquired in the same storage location in the information processing apparatus where the event correspondence application program is installed to overwrite the event correspondence application program therewith without changing a content which has registered on the information processing apparatus.

* * * * *